United States Patent Office 2,742,483
Patented Apr. 17, 1956

2,742,483
PROCESS FOR OBTAINING CRYSTAL VIOLET LACTONE

Nathan N. Crounse, Cincinnati, Ohio, assignor to Sterling Drug Inc., New York, N. Y., a corporation of Delaware No Drawing. Application June 14, 1954,
Serial No. 436,715

4 Claims. (Cl. 260—343.4)

This invention relates to an improved process for obtaining 3,3 - bis(4 - dimethylaminophenyl) - 6 - dimethylaminophthalide, or, as this compound has been more simply designated, crystal violet lactone.

It is known to prepare crystal violet lactone by oxidizing 2 - [4,4' - bis - (dimethylamino)benzohydryl] - 5 - dimethylaminobenzoic acid in an aqueous medium with an oxidizing agent such as lead dioxide, in accordance with the following equation:

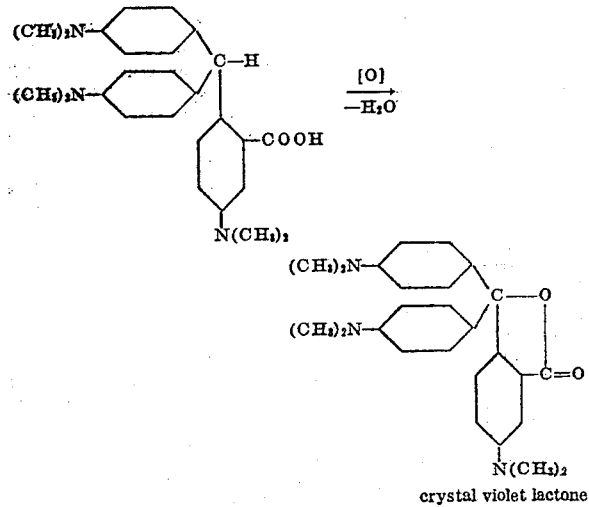

crystal violet lactone

This reaction is generally carried out at 25–30° C. or less to minimize undesirable side reactions. Instead of lead dioxide, there can be used in this process various other conventional agents for the oxidation of triphenylmethane derivatives, for example potassium permanganate, hydrogen peroxide, potassium dichromate, etc. The product of the oxidation process of the prior art is a dark blue gummy material which is obtained in about 40% yield and which melts over a considerable range, usually about 90–110° C. Assay of this product by hydrolysis with hydrochloric acid and titration with titanium trichloride to determine reducible hydroxyl (available by hydrolysis of the lactone ring) gives a value of only about 50–60%, which indicates that the oxidation product has an undesirably low degree of purity. Moreover, the purification of the crude material to yield crystal violet lactone of good quality melting at 179–180° C., as by recrystallization from aqueous ethanol, involves a considerable reduction of yield. The prior art method of oxidation for obtaining crystal violet lactone is thus unsatisfactory from the several standpoints of yield, quality of product, and economy.

It is an object of the present invention to provide an improved method for obtaining crystal violet lactone of good quality economically and in satisfactory yield.

In particular, my invention relates to an improvement in the prior art method for oxidizing 2-[4,4'-bis-(dimethylamino)benzohydryl-5-dimethylaminobenzoic acid with an aqueous oxidizing medium to produce crystal violet lactone, said improvement comprising carrying out the oxidation reaction with a lower molecular monocylic aromatic hydrocarbon in intimate contact or admixture with the oxidizing medium, the amount of the hydrocarbon employed preferably being sufficient to dissolve substantially all of the crystal violet lactone produced, and recovering the crystal violet lactone from the hydrocarbon solution. Neutral and basic aqueous oxidizing media are useful directly in my invention. Acidic oxidizing media should be adjusted to pH 3 or above, since under strongly acidic conditions the crystal violet lactone, which is a basic substance, is not produced as such but instead the product is a water-soluble salt of crystal violet lactone which is not completely extracted into the hydrocarbon phase.

Thus, the process of my invention comprises the several steps of: treating 2-[4,4'-bis-(dimethylamino)benzohydryl]-5-dimethylaminobenzoic acid with an aqueous oxidizing medium having in intimate admixture therewith, as a water-insoluble phase, a lower molecular monocyclic aromatic hydrocarbon to produce crystal violet lactone; separating the hydrocarbon phase, which contains the crystal violet lactone dissolved therein, from the aqueous medium; and recovering the crystal violet lactone from the separated hydrocarbon phase.

The lower molecular monocyclic aromatic hydrocarbon which is used in my process is, for example, benzene and lower alkylated benzenes such as toluene, ethylbenzene, o-xylene, m-xylene, p-xylene, isopropylbenzene, mesitylene, cumene, and the like, or mixtures of two or more of such compounds, which are substantially water-insoluble. Crystal violet lactone is soluble in these water-insoluble hydrocarbons while the starting 2-[4,4'-bis-(dimethylamino)benzohydryl]-5-dimethylamino benzoic acid is substantially insoluble therein.

It will be appreciated that the aqueous oxidizing medium itself, without the presence of the water-insoluble lower molecular monocyclic aromatic hydrocarbon phase, is old and conventional in the art. Thus, as the oxidizing agent in my process, there can be employed any of the conventional agents useful for the oxidation of triphenylmethane derivatives to the corresponding triphenylcarbinol derivatives, for example potassium permanganate, hydrogen peroxide, potassium dichromate, lead dioxide, manganese dioxide, and the like. I generally prefer to employ potassium permanganate.

In carrying out my new process it is convenient to effect the intimate admixture of the hydrocarbon with the aqueous phase of the reaction medium by maintaining efficient stirring or agitation of the mixture during the oxidation reaction. The crystal violet lactone, as it is formed, is thus rapidly extracted into the hydrocarbon phase. It is also advantageous to employ an amount of the hydrocarbon in considerable excess of the quantity required to dissolve all of the crystal violet lactone produced by the reaction. After completion of the reaction, and preferably after filtering the reaction mixture to remove solid material, the separation of the water-insoluble hydrocarbon phase from the aqueous medium is of course readily accomplished in conventional fashion, as by use of a separatory funnel, decantation, centrifugation, etc.

The recovery of the crystal violet lactone from the separated hydrocarbon phase is readily effected by distilling off the hydrocarbon. I have usually found that it is preferable to distill off most of the hydrocarbon from the solution and then add to the concentrated solution a liquid aliphatic hydrocarbon, in which crystal violet lactone is substantially insoluble, which causes the separation of the crystal violet lactone in good yield. Another method for recovering the crystal violet lactone consists in extracting the hydrocarbon solution with an aqueous solution of a strong acid and precipitating the crystal violet lactone from the acidic solution by treatment with base.

My invention is illustrated by the following examples without, however, being limited thereto.

*Example 1*

A mixture of 19.8 g. of 2-[4,4'-bis-(dimethylamino)-benzohydryl]-5-dimethylaminobenzoic acid (M. P. 195–197° C.), 200 ml. of water, and 100 ml. of benzene was placed in a 500 ml. flask fitted with an efficient stirrer, a thermometer, and a dropping funnel. Over a period of thirty minutes, while maintaining the temperature of the mixture at 25–30° C., there was added through the dropping funnel a solution of 6 g. of potassium permanganate in 200 ml. of water. There was then added to the reaction mixture 5 g. of barium chloride dihydrate and, after five minutes of stirring, 6 g. of activated carbon and 6 g. of diatomaceous earth were added. After a further twenty minute period of stirring, the reaction mixture was filtered and the solid which collected on the filter was washed with 100 ml. of benzene. The benzene layer was separated from the combined filtrate and benzene wash, and the benzene layer was concentrated to a volume of 75 ml. by distilling off the greater portion of the benzene. To the concentrated benzene solution there was added slowly with stirring 150 ml. of an alipathic petroleum hydrocarbon fraction boiling at 305–405° F. ("Varnolene"). The cream-colored solid which separated from the solution was collected on a filter and washed with 50 ml. of the aliphatic petroleum hydrocarbon fraction. The solid was then dried in a vacuum oven at 65° C. There was thus obtained 13.0 g. of crystal violet lactone as a light tan solid which melted at 179–180° C.

Assay of the product obtained as described above for reducible hydroxyl by hydrolysis with hydrochloric acid and titration with titanium trichloride gave a value of 98.5%, thus indicating an excellent conversion of the starting triphenyl methane derivative used in my process to the corresponding triphenylcarbinol derivative, namely crystal violet lactone.

When an equivalent amount of toluene was substituted for the benzene employed in the oxidation procedure described above, there was obtained crystal violet lactone of substantially the same quality and in substantially the same yield. When xylene, ethylbenzene, and isopropylbenzene were employed instead of benzene, the crystal violet lactone was obtained in each instance in slightly decreased yield but with no change in the quality of the product.

*Example 2*

The process described above in Example 1 was repeated using 19.8 g. of a crude, technical grade of 2-[4,4'-bis-(dimethylamino)benzohydryl]-5-dimethylaminobenzoic acid melting at 174–178° C.; the amount of potassium permanganate used was increased to 7.5 g.; and 100 ml. of toluene was employed in place of benzene. The yield of crystal violet lactone obtained was 12 g., and the product melted at 178–181° C.

*Example 3*

To a mixture of 19.8 g. of a crude, technical grade of 2 - [4,4' - bis - (dimethylamino)benzohydryl] - 5 - dimethylaminobenzoic acid melting at 174–178° C., 110 ml. of toluene, and 300 ml. of water there was added 6 g. of potassium permanganate crystals in small portions over a period of thirty minutes, the reaction mixture being stirred at 25–30° C. during this addition. To the reaction mixture there was then added 5 g. of barium chloride dihydrate, 6 g. of activated carbon and 6 g. of diatomaceous earth ("Dicalite"). The reaction mixture was filtered and the toluene layer was separated from the aqueous layer of the filtrate. The toluene solution was extracted with 250 ml. of 5% sulfuric acid and the acid extract was shaken with 50 ml. of an aliphatic petroleum hydrocarbon fraction boiling at 305–405° F. The aqueous acidic layer was separated from the hydrocarbon layer and then adjusted to pH 3 by addition of 25% sodium hydroxide solution. The solid which separated from solution was collected on a filter, washed with water and with aliphatic petroleum hydrocarbon fraction, and dried. There was thus obtained 14.5 g. of crystal violet lactone which melted at 172–175° C.

*Example 4*

29 g. of trisodium phosphate dodecahydrate, 9 g. of 100% sulfuric acid, and 85 ml. of water were mixed to form a solution having pH 3.1. This solution was mixed with 200 ml. of toluene and 19.8 g. of 2-[4,4'-bis-(dimethylamino)benzohydryl]-5-dimethylaminobenzoic acid. This mixture was stirred well at room temperature (about 25° C.) and there was added in one portion an aqueous slurry of 28.9 g. of lead peroxide. The reaction mixture was stirred for a period of two and one half hours; during the first thirty minutes of this period the temperature of the mixture rose to 34° C. The reaction mixture was then filtered and the aqueous and hydrocarbon layers of the filtrate were separated. The toluene solution was extracted with 100 ml. of 7% sulfuric acid. The solid collected in the filtration was slurried with 100 ml. of 7% sulfuric acid and filtered and the acidic filtrate was combined with the acidic extract of the toluene solution. The acidic solution was adjusted to pH 4.8 by addition of aqueous sodium carbonate solution and the solid which separated from solution was collected on a filter. The solid thus collected weighed 5.5 g. and melted at 108–113° C. This product contained a small amount of crystal violet lactone. The filtrate was adjusted to pH 7.5 by the addition of a further quantity of sodium carbonate solution and the solid which separated from solution was collected on a filter. There was thus obtained 10 g. of crystal violet lactone which melted at 176–179° C.

I claim:

1. The process for obtaining crystal violet lactone which comprises: oxidizing 2-[4,4'-bis-(dimethylamino)-benzohydryl]-5-dimethylaminobenzoic acid with an aqueous oxidizing medium having in intimate admixture therewith, as a water-insoluble phase, a lower molecular monocyclic aromatic hydrocarbon to produce crystal violet lactone; separating said hydrocarbon phase, which contains the crystal violet lactone dissolved therein, from the aqueous medium; and recovering the crystal violet lactone from the separated hydrocarbon phase.

2. The process for obtaining crystal violet lactone which comprises: oxidizing 2-[4,4'-bis-(dimethylamino)-benzohydryl]-5-dimethylaminobenzoic acid with an aqueous solution of potassium permanganate having in intimate admixture therewith, as a water-insoluble phase, a lower molecular monocyclic aromatic hydrocarbon to produce crystal violet lactone; separating said hydrocarbon phase, which contains the crystal violet lactone dissolved therein, from the aqueous medium; and recovering the crystal violet lactone from the separated hydrocarbon phase.

3. The process for obtaining crystal violet lactone which comprises: oxidizing 2-[4,4'-bis-(dimethylamino)-benzohydryl]-5-dimethylaminobenzoic acid with an aqueous solution of potassium permanganate having benzene in intimate admixture therewith, as a water-insoluble phase, to produce crystal violet lactone; separating said benzene phase, which contains the crystal violet lactone dissolved therein, from the aqueous medium; and recovering the crystal violet lactone from the separated benzene phase.

4. The process for obtaining crystal violet lactone which comprises: oxidizing 2-[4,4'-bis-(dimethylamino)-benzohydryl]-5-dimethylaminobenzoic acid with an aqueous solution of potassium permanganate having toluene in intimate admixture therewith, as a water-insoluble phase, to produce crystal violet lactone; separating said toluene phase, which contains the crystal violet lactone dissolved therein, from the aqueous medium; and recovering the crystal violet lactone from the separated toluene phase.

References Cited in the file of this patent

UNITED STATES PATENTS

| Re. 23,024 | Adams | Aug. 17, 1948 |
| 2,417,897 | Adams | Mar. 25, 1947 |

FOREIGN PATENTS

| 692,956 | Germany | June 29, 1940 |